April 14, 1970  F. A. UNDERWOOD  3,505,811
CONTROL SYSTEM FOR A COMBINED GAS TURBINE AND STEAM
TURBINE POWER PLANT INVENTOR:
FRANK A. UNDERWOOD,
BY W. C. Crutcher
HIS ATTORNEY.

United States Patent Office 3,505,811
Patented Apr. 14, 1970

3,505,811
CONTROL SYSTEM FOR A COMBINED GAS TURBINE AND STEAM TURBINE POWER PLANT
Frank A. Underwood, Cape Elizabeth, Maine, assignor to General Electric Company, a corporation of New York
Filed Sept. 23, 1968, Ser. No. 761,511
Int. Cl. F02c 7/02; F02d 25/00
U.S. Cl. 60—39.03
8 Claims

ABSTRACT OF THE DISCLOSURE

In a combined steam turbine and gas turbine power plant wherein the gas turbine exhaust gas is utilized to generate steam for driving the steam turbine, the temperature of the exhaust gas is raised by controlled supplemental firing to increase the quantity of steam available for the steam turbines. A load sharing control is programmed to insure an optimum power split between the gas turbine and the steam turbine at all levels of loading.

BACKGROUND OF THE INVENTION

Figure 1:
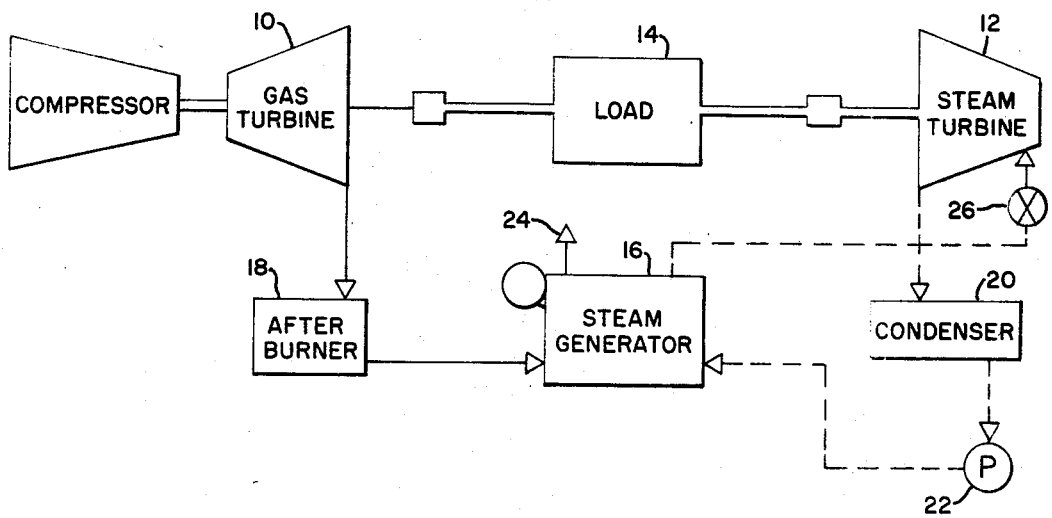

This invention relates to improvements in the efficiency of integrated power plants employing a gas turbine and a steam turbine driven by steam generated by the exhaust gas of the gas turbine which exhaust gas is reheated by supplemental burning of additional fuel. More specifically, the invention relates to a control system for operating such a power plant so that the loading and thermodynamic conditions associated therewith closely correspond to predetermined performance curves.

The inclusion of a steam generator in the path of gas turbine exhause gases for waste heat recovery is not new in itself. Presently, such waste heat is being used to generate steam for driving steam turbines which provide an additional power output which, in turn, increases the overall efficiency of the power plant. Design efforts are continually being made to derive optimum performance from such a combined cycle and several arrangements and control systems have been suggested.

In U.S. Patent 2,554,228 issued to C. J. Walker et al. on May 22, 1951, it is suggested that the flow rate of turbine exhaust gas through a steam generator be controlled independently of load demand on the turbine or of a variable ambient temperature by means of throttling the gas flow through the gas turbine. However, such arrangemetns which substantially change the mass flow through the gas turbine result in throttling losses, reduced firing temperatures in the gas turbine, and decreased turbine and compressor efficiencies. In U.S. Patent 3,150,487 issued to J. L. Mangan et al. on Sept. 29, 1964 and assigned to the present assignee, a load is shared by a steam turbine and a gas turbine and the compressor inlet air is heated to increase the part load efficiency of the coupled units. In pending application Ser. No. 674,015, of P. G. La Haye, now U.S. Patent 3,422,800 issued Jan. 21, 1969, an arrangement is shown whereby the air entering the gas turbine compressor is controllably heated with gas turbine exhausts so as to independently control steam generation despite varying ambient temperatures or varying gas turbine loads. So it can be seen that several approaches have been taken to capitalize on the inherent high efficiency of the combined cycle and to increase that efficiency by regeneration or by controlling the motive fluids in some manner.

The present invention contemplates the controlled addition of heat to the gas turbine exhaust gases prior to steam generation in the steam turbine cycle. In known combined cycle power plants without such supplemental firing, the steam turbine operates as a valve-wide-open or slave unit (variable steam header pressure), which accepts the total generation capacity of the steam generator over the entire load range. This results in a mode of operation which is thermodynamically optimum. This mode of operation, i.e., a substantially wide open steam valve, would also result in a thermodynamically optimum operation in the case of combined plants which employed supplemental firing. However, known supplemental fired combined plants do not operate in this mode, but rather attempt to maintain constant throttle pressure to the steam turbine with consequent throttling losses.

With supplemental fired units then, the problem is to control the addition of heat to the exhaust gases in response to steam flow steady state requirements. This would serve to improve the conventional method of maintaining a constant throttle pressure to the steam turbine by means of supplemental firing. The latter implies variable steam turbine control valve position and is thought to be inherently less efficient.

Accordingly, one object of the present invention is to provide an improved control system for coordinating the power contributions of the steam turbine and the gas turbine of an integrated power plant.

Another object of this invention is to provide an improved control system for a combined gas turbine and steam turbine power plant which control insures maximum thermodynamic efficiency at all levels of loading.

DRAWING

Figure 2:
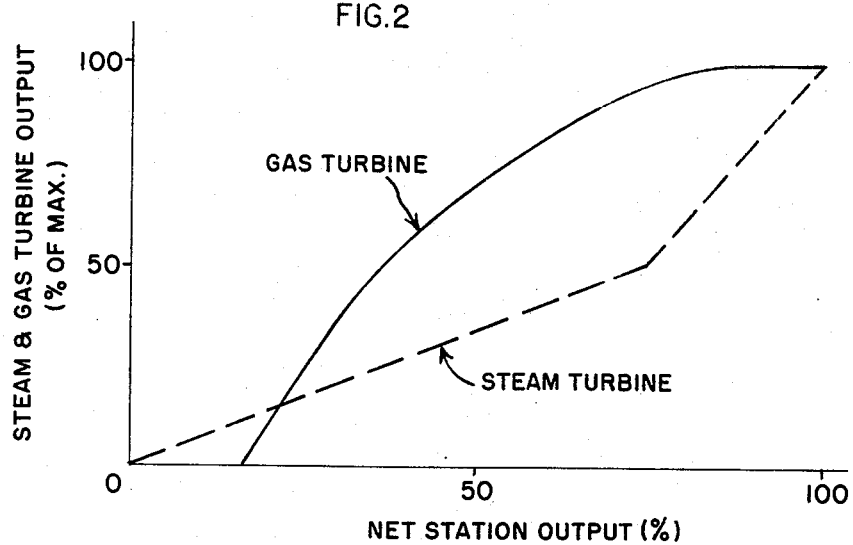
Figure 3:
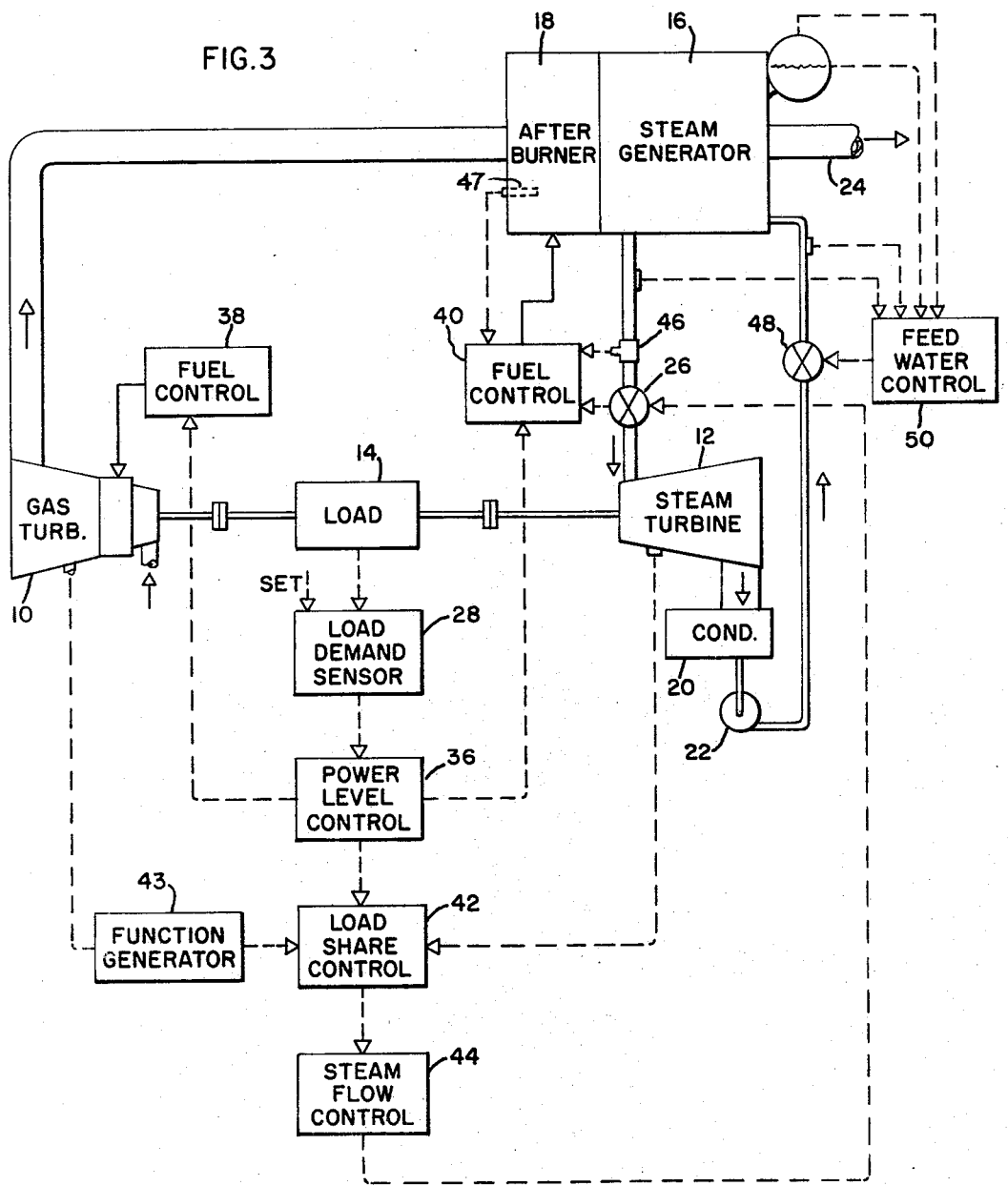

The subject matter which is regarded as the invention is particularly pointed out and distinctly claimed in the concluding portion of the specification. The invention, however, both as to organization and method of practice, together with further objects and advantages thereof, may best be understood by reference to the following description taken in connection with the accompanying drawings in which:

FIG. 1 is a simplified schematic diagram of a combined gas turbine and steam turbine power plant in a tandem shaft arrangement with supplemental firing of the gas turbine exhaust, FIG. 2 is a graph of individual steam turbine and gas turbine power contribution requirements (in percentage of maximum load for each prime mover) vs. net station output, which requirements are typical of those which must be forced on each prime mover for the optimum thermodynamic performance of the overall station, and FIG. 3 is a simplified schematic diagram of a control system for maintaining the supplemental firing at maximum thermodynamic efficiency and for operating the prime movers of the power plant shown in FIG. 1 so that the respective power contributions correspond to the curves on the graph shown in FIG. 2.

SUMMARY OF THE INVENTION

Briefly stated, the invention is practiced by providing a primary control system which requires the steam turbine and gas turbine to share the station load in accordance with predetermined power contribution curves. A secondary independent control system is provided which minimizes thermodynamic loss at reduced loads by controlling the supplemental firing of the exhaust gases in response to an input signal which is a programmed steam header pressure set primarily as a function of net station output.

DESCRIPTION OF PREFERRED EMBODIMENT

Referring now to the drawings in which the numerals are used to indicate like parts throughout the various views thereof, FIG. 1 shows a typical combined gas turbine and steam turbine power plant. The plant configuration is a tandem-shaft arrangement with a gas turbine 10 and a steam turbine 12 connected in drive relationship with a load 14 disposed therebetween.

In the following description the load is assumed to be a compressor for the purpose of discussion. Although the load is shown mechanically connected both to the gas turbine 10 and the steam turbine 12, both the load and the interconnection between units could also be electrical, e.g., each turbine driving a separate generator connected to the same electrical network.

Steam is supplied to the steam turbine 12 from a steam generator 16. The necessary heat from steam generation is supplied to the steam generator 16 by the exhaust gases of the gas turbine 10. These contain sufficient oxygen to permit additional combustion or reheating in an afterburner 18. The steam turbine 12 is part of an independent steam cycle including a condenser 20, which supplies water to a boiler feed pump 22, which water is then converted to steam within the steam generator 16. The steam generator is provided with a stack 24 which may be fitted with economizers (not shown) and which emits the exhaust gases to the atmosphere. The steam leaves the steam generator 16 and is directed to the steam turbine 12 through a bank of steam turbine control valves indicated as numeral 26. After passing through the steam turbine 12, the steam is then directed to the condenser 20 to repeat the overall steam cycle.

FIG. 2 shows the power split required by each turbine in order to obtain an optimum thermodynamic performance from the power plant as shown in FIG. 1 with a 50/50 steam turbine/gas turbine power split at full load. Of course, as long as the net station output remains at full load, there is no need for any load control. As the net station output is reduced from full load to partial load or from one partial loading to another, however, it becomes important for each of the two turbines to operate at a particular output percentage of full load for that turbine at each level of net station output.

In reducing the net station output according to the graph of FIG. 2, the gas turbine 10 remains at full load between 100% and approximately 75% of net station output. When the net station output is reduced, the steam turbine output therefor falls off quite sharply. The steep curve between 100% and 75% of the net station output for the steam turbine is obtained by properly reducing the variable firing rate of the afterburner 18. At approximately 75% of net station output, the afterburner is at maximum turndown (minimum firing rate) and the gas turbine firing must now be coordinated with the steam turbine in a manner approximating that of existing combined cycles which recover only sensible heat in the gas turbine exhaust, in which the steam turbine reduces its load proportionately as a wide-open-valve or slave unit. It will be noted that when the gas turbine is at 0% output, the steam turbine is still putting out approximately 10% of its maximum power. This is due to the fact that the gas turbine supplies exhaust gas for generating steam in the steam generator 16 even though the gas turbine 10 provides no useful power output and is, in effect, idling.

FIG. 3 shows a control scheme which has been conceived with a load sharing technique designed to guarantee optimum power plant performance in terms of efficiency and planned economy over the normal load range for a power plant as shown in FIG. 1. It should be understood that the possible combination of gas turbine and steam turbine performance curves which may be desirable for any given power plant between 0% net station output and 75% net station output is virtually infinite. For this reason, it should be emphasized that the control scheme shown in FIG. 3 may be programmed for any of these infinite permutations but will be discussed only in terms of the optimum curves shown in FIG. 2.

A primary control system is provided to controllably split a demand load between the two turbines, which system includes a load demand sensor 28 associated with the load 14. The details of sensor 28 will vary according to the nature of the load, but are known to those skilled in the art. In the example shown, where the load is a compressor connected between turbines in a tandem shaft arrangement, the sensor 28 may consist of a device to select a signal from a transducer responsive to load compressor discharge pressure. If the load were a generator, the sensor might be responsive to output frequency.

The sensor 28 sends a load demand signal to a master power level control 36 which establishes a gas turbine reference power in a gas turbine fuel control 38 and further provides a reference signal to an afterburner fuel control 40 in terms of an afterburner firing rate.

When the gas turbine is at part load (minimum supplementary firing), and as an increase swing in the load demand is experienced, the power reference signal to the gas turbine 10 is correspondingly increased which thereby forces the gas turbine 10 to absorb the new load. This is desirable as the gas turbine usually should absorb load increases. While the gas turbine 10 is absorbing this greater swing load, a load share control 42, a part of the primary system, receives output power signals from the steam turbine 12 and also from the gas turbine 10 through a function generator 43. The load share control 42 similarly receives signals from the power level control 36 and compares these with the aforementioned output power signals from the two turbines to compute a command signal which is transmitted to a steam flow control 44. The steam flow control 44 then sends an appropriate signal to the steam turbine control valves 26 which properly adjust the steam turbine power contribution to the net station output in a slow reset fashion, thereby forcing a programmed load split in the limiting or steady state condition.

In existing combined cycle power plants, the steam turbine 12 is run as a valve-wide-open machine which results in thermodynamic losses at reduced loads. Since such losses are undesirable, a secondary control system is provided by which the operation of the afterburner fuel control 40 is coordinated with the operation of the steam turbine control valves 26 to minimize the thermodynamic losses by varying the position of the valves 26 and controlling the afterburner fuel rate so as to preclude throttling losses and thereby insure a proper steady state process. This secondary control system is primarily a steam pressure control but is different from the conventional waste heat steam generator controls, in that the reference afterburner firing rate is a set point which is a programmed steam header pressure as a function of net station output.

In tracing this secondary system for afterburner control, the steam turbine flow control 44 dictates the amount of team flow through the steam turbine control valves 26 which in turn send back a signal to the afterburner fuel control 40 which signal corresponds to actual valve position. The afterburner fuel control 40 receives an actual steam pressure signal from the output line or pressure header of the steam generator at point 46 and a reference header pressure signal programmed as a function of net station output from the power level control 36, compares these two signals with the aforementioned valve position signal, computes a proper fuel flow for the afterburner 18 and then transmits an appropriate signal thereto. The function of the valve position signal is to readjust the set point of control 40 as determined by the valve position and to the extent that the valve is not substantially wide open. In other words, the supplemental firing rate set point is increased so that steam flow will increase whereupon the valve will move to a more open position.

Exhaust gas temperature signals are transmitted from the high temperature side of the afterburner 18 from sensor 47 to the afterburner flow control 40 as a feedback reference signal to insure that maximum limiting gas temperatures are not exceeded. The afterburner flow control 40 set point (reference steam header pressure signal) will be continually and automatically adjusted by the valve position signal until minimum throttling occurs through the steam turbine control valves 26. Due to this reduced throttling condition, maximum thermodynamic efficiency is now possible. Ultimately, when steady state operation is finally reached, the control valves 26 will be in a constant and substantially wide open position over the new normal load range. Some valve movement margin may be allowed, however, for rapid load transients.

Another independent system which may be included in such a combined power plant as a tertiary system is a feedwater control. A feedwater valve 48 is operated by a signal from a feedwater control element 50 which responds to the signal inputs of steam flow, feedwater flow, drum water level and drum pressure signals, as indicated in the drawing.

In overall operation, as net station power output is reduced from 100% to a partial loading, the new load demand signal is sent from the load demand sensor 28 to the power level control 36, which then sends power reference signals to the gas turbine fuel control 38, the afterburner fuel control 40 and the load share control 42. The first two of these three power level control signals cause the gas turbine 10 to reduce its output and cause the afterburner fuel control 40 to lessen the supplemental afterburning firing. The load share control 42 transmits a signal to the steam flow control 44 which signal corresponds to the new steam turbine power contribution requirement at the new lower net station loading. While the foregoing operation is being performed by the primary control system, optimum steady state conditions are being established through the steam power control valves 26 by the independent secondary control system, previously mentioned, which requires that the valves 26 and the afterburner control 40 adjust to provide minimum throttling.

At approximately 75% of total power plant output, the afterburner firing rate is at a minimum (maximum turndown) and the supplemental heating of the exhaust gases ceases, which results in the steam turbine operating in a manner approximating the slave steam turbine operation of conventional combined cycle power plants in which the valves 26 are wide open. The load demand sensor 28 now sends lower power level control signals to the power level control element 36 which, in turn, sends lower signals to the gas turbine fuel control 38. The load share control 42 continues to receive signals from the gas turbine fuel control 38 and from the steam turbine 12, and so the load share control 42 may thereby continue to control the steam turbine control valves 26 through the steam flow control 44, as necessary. As previously discussed, the load share control 42 insures that proper steam flow is supplied to the steam turbine 12 to keep the performance of the steam turbine 12 on the optimum curve shown in FIG. 2.

In this embodiment, the gas turbine absorbs all increasing transient load swings and a slow reset is forced upon the steam turbine for power plant economics. If, in a specific combined power plant application, it becomes apparent that the steam turbine is the fast reacting machine and that it should absorb the load demand swing instead of the gas turbine, the load share signals may be reversed to accomplish such a new scheme. In this manner, the control system provides considerable flexibility.

The invention has been herein disclosed in its simplest form. If generator steam temperature problems should occur due to the use of one afterburner, the supplemental firing could be accomplished by a series of refiring operations, or water could be sprayed into the steam to control temperature in a manner apparent to those skilled in the art.

A combined gas turbine and steam turbine power plant with an improved control system has been herein disclosed which combination insures maximum thermodynamic efficiency at all levels of loading. It should be noted that due to the controlled supplemental firing of the exhaust gases, it is now feasible to incorporate larger steam turbines in such an integrated plant, which larger steam turbines provide greater net station outputs than presently available. It should also be noted that due to the flexibility and insured steady state operation of a power plant equipped with the present invention, an integrated power plant may be economically operated at virtually any power level.

Although net station output has been referred to as determining the pressure set point, the gas turbine output can also be used to determine this because once the gas turbne output is known, the net station output can be determined therefrom, in accordance with the invention.

What I claim as new and desire to secure by Letters Patent of the United States is:

1. A control system for a combined cycle power plant comprising:
   a gas turbine,
   a steam turbine,
   inlet steam control valves for varying the amount of steam passing through said steam turbine,
   a load connected in drive relationship with said gas and steam turbines,
   a steam generator disposed to generate steam from the heat of the exhaust gases of said gas turbine,
   supplemental firing means for reheating the exhaust gas by burning additional fuel ahead of the steam generator, and
   primary control means responsive to load demand and operable to force a programmed load split between said gas turbine and said steam turbine according to the total load.

2. The combination according to claim 1 and further including a secondary control means which is responsive to a signal which corresponds to reference header steam pressure programmed as a function of net station output, said secondary control means being operable with said primary control means to insure optimum steady state conditions through the steam cycle by adjusting said steam control valves and the firing rate of said supplemental firing means so as to minimize throttling through said steam inlet control valves.

3. The combination according to claim 2, wherein the signal transmitted to said secondary control means includes an input which corresponds to the valve position of said inlet steam control valves.

4. The combination according to claim 1, wherein said load is transient and wherein said primary control means is operable to force the transient load swing on said gas turbine with a slow reset forced upon said steam turbine.

5. The combination according to claim 1, wherein said load is transient and said primary control means is operable to force the transient load swing on said steam turbine with a slow reset forced upon said gas turbine.

6. The combination according to claim 1 with the addition of a tertiary control means which is responsive to steam flow from said steam generator to said steam turbine and to feedwater flow through said generator and which is operable to insure optimum feedwater flow for each level of steam flow demand.

7. A process for controlling a combined gas turbine and steam turbine power plant, wherein the exhaust gas of the gas turbine is refired and utilized to generate steam for driving the steam turbine comprising the steps of:
   controllably forcing the steam turbine and gas turbine to contribute to the demand load in accordance with predetermined performance curves, and controllably refiring the exhaust gas in accordance with a reference header steam pressure programmed as a function of net station output.

8. The process according to claim 7 and including the additional step of:

ajusting the reference header pressure in response to deviation of the turbine valve from a substantially wide open position, whereby steady state throttling losses are minimized.

References Cited

UNITED STATES PATENTS

| | | |
|---|---|---|
| 2,554,228 | 5/1951 | Walker et al. _____ 60—30.07 |
| 2,605,610 | 8/1952 | Hermitte et al. |
| 2,663,144 | 12/1953 | Nordstrom et al. |
| 3,150,487 | 11/1954 | Mangan et al. _____ 60—39.18 |

CARLTON R. CROYLE, Primary Examiner

U.S. Cl. X.R.

60—39.18